United States Patent Office

Re. 28,219
Reissued Oct. 29, 1974

28,219

IMAGE CONSTRUCTION SYSTEM USING MULTIPLE ARRAYS OF DROP GENERATORS

Richard P. Taylor, Chillicothe, Russell H. Van Brimer, Oakwood, and Fred E. Culp, Chillicothe, Ohio, assignors to The Mead Corporation, Dayton, Ohio Original No. 3,560,641, dated Feb. 2, 1971, Ser. No. 768,790, Oct. 18, 1968. Application for reissue Oct. 24, 1972, Ser. No. 299,890

Int. Cl. G01d *15/18*

U.S. Cl. 346—75 3 Claims

Matter enclosed in heavy brackets [ ] appears in the original patent but forms no part of this reissue specification; matter printed in italics indicates the additions made by reissue.

ABSTRACT OF THE DISCLOSURE

Arrays of laterally spaced orifices, all communicating with a liquid pressure supply, all subjected to vibration at the same frequency to separate the liquid jets into streams of individual drops, provide a system for locating all of the drops with a predetermined space-time correlation, by depositing the drops on a receiving element which has relative movement with respect to the arrays at a speed correlated to the drop generation rate, or by irradiating the drops in space at a predetermined time to make them visible. Uses include printing multiple copies from a master, high-speed printout from a computer or memory, and creation of variable three dimensional visible shapes for study.

CROSS REFERENCE TO RELATED APPLICATIONS

[This application is related to copending applications entitled Image Control System With Scanning Drop Generators, Ser. No. 768,800, High Speed Precision Placement of Liquid Drops, Ser. No. 768,767, Image Reconstruction System, Ser. No. 803,910, and Coordinate Placement of Ink Drops, Ser. No. 768,766 all filed of even date herewith and assigned to the same assignee.]

*This application is related to U.S. Pats. 3,564,120, 3,560,988 and 3,604,846 all of which copended with the parent application hereof.*

BACKGROUND OF THE INVENTION

This invention relates to systems in which discrete uniformly sized drops of fluid, for example a marking fluid such as ink, are projected in a controlled manner to achieve a predetermined space-time correlation. A typical use of the invention is in high-speed printing wherein the drops are selectively placed on a paper web moving at relatively high speed past a drop generating device. It is proposed that the drop generating device include a plurality of arrays of orifices from which common size drops are projected at a common frequency. Selected drops are switched or deflected into catchers, while the remainder follow their trajectory to create a pattern in space and time. A typical use of the invention is in high-speed printing where the drops are deposited on a moving web, thus creating a two-dimensional print in timed relation with web movement.

The prior art has suggested various ways of producing the uniformly sized and synchronously generated drops, a typical example being a system such as disclosed in the U.S. Patent to Sweet et al., No. 3,373,437. Little attention has been given however, to drop space-time correlation or to packing a large number of orifices in near enough proximity to permit solid area printing by parallel digital switching. In printing, for example, if the drops are to be placed precisely both vertically and horizontally to form a desired image or pattern there must be a definite relationship between the rate of drop generation and the paper movement, and this relationship should in turn be correlated to the spacing between adjacent drops to be deposited on the paper.

The situation is complicated by physical demands of the drop generating assembly and array. The orifices must be spaced apart a certain minimum distance in order to accommodate the charging and deflecting electrodes, and also to accommodate the catcher system into which some drops are deflected. As a result, it has been found from the practical standpoint that the spacing between orifices in an array, under the confinement of physical sizes and dimensions, is substantially greater than is desired in order to deposit the relatively small drops, in the order of 0.003 to 0.005 inch, adjacent to each other. In the ideal case, in order to form a completely solid image, it is necessary that the dots adjoin or slightly overlap each other, or at least are placed so closely side by side that there is no apparent background between them. It has been possible to generate drops which produce a deposit of this size through orifices having a diameter in the order of 0.001 inch, however it is not possible to space these orifices and associated parts from each other by the relatively few thousandths of an inch required in order to achieve the desired result.

SUMMARY OF THE INVENTION

The present invention relates to a method and apparatus by means of which a plurality of drops of fluid, such as a marking substance, can be selectively projected and closely spaced in timed spatial relation. In a particular embodiment the movement of a *longitudinally transported* sheet or web is correlated to drop generation from several arrays, such that solid coverage over substantial areas of the sheet or web can be achieved by reason of the adjacent or slightly overlapping position of the drops deposited on the surface.

This is accomplished by the use of a plurality of arrays of drop generating devices, each of which extends transversely of the direction of movement of the sheet or web, and each of which includes drop generating orifices and associated control equipment for the individual drops from each orifice, arranged in predetermined spaced position. The multiple arrays are *laterally staggered* [mounted offset] with respect to each other such that drops eminating from the arrays will deposit along predetermined interlaced and relatively thin laterally spaced, *longitudinally extending* [lengthwise] bands or strips. It is thereby possible to obtain coverage of the entire cross section of the sheet or web. By correlating the drop generation rate with drop size and with paper advancement rate, it is possible to deposit successive drops in each of the above-mentioned strips in controlled closely spaced positions whereby each band or strip can be filled with an essentially continuous *drop* deposit *pattern*.

By timing drop switching signals in accordance with paper advancement rate and with the longitudinal spacing of the orifice arrays, it is possible to create an intelligible drop deposit pattern. For high resolution in the drop deposit pattern, it is possible to phase-synchronize drop generation with drop switching thereby depositing each drop at an accurately centered position within a predetermined drop deposition matrix.

By applying intelligence signals to the control electrodes of the individual drop generating units in each of the arrays, it is possible to control the deposit of any given drop over the entire area of the web. Considering an image area or pattern to be produced on the web or sheet, each drop generated by each array is destined for a particular cell or coordinate position, in an x—y matrix of the image or pattern, on the sheet or web, and whether or not that particular drop reaches its cell depends on the intelligence imposed on the corresponding controlled electrodes. In other words, the intelligence signal determines whether or not a drop is desired at each particular x—y coordinate, and determines whether or not the drop is deflected or permitted to deposit on the sheet or web as the portion of the image or pattern generated.

In one embodiment of the invention, an image to be created on the sheet or web can be formed from a master placed in an optical scanner. The electro-optical pickup of the scanner includes an individual sensor for every x—y coordinate of the image matrix. Each senor is in turn connected to a corresponding control electrode in one of the arrays, and through proper coordination, the scanner produces the intelligence signals which control the deflection, or lack of it, resulting in production of an image or pattern on the web passing the arrays. It will be appreciated that the scanner should have sensors spaced and staggered according to the arrangement of the arrays and their individual orifices, or suitable electrical delays should be introduced to produce the same result.

It is of course possible to use for the receiving surface individual sheets of paper or other suitable material, or a relatively long continuous web can be used. Furthermore, the invention has particular and unique utility with regard to marking or printing on irregular surfaces. This is true because the irregularities of the surface, unless they be very deep with respect to the travel of the drops, have little effect upon the horizontal deposition pattern of the drops. Thus, a "print" made on an irregular surface such as sandpaper, various textiles, or wavy surfaces as of corrugated paper, can be achieved with greater clarity and much less difficulty than with conventional printing methods which require contact of an inked plate or other member with the material to be imprinted. Also, the shape of the arrays need not be linear, but can be curved or shaped to relate to the configuration of the receiving element. As examples, successful results have been obtained printing on sandpaper and corrugated medium; other typical applications include printing or marking on bottles, cans, and other containers.

The present invention also includes a printer output for electronic data processing equipment. It is possible to generate printed material, such as text material, at high speeds with the equipment provided by this invention, for example speed in the order of 2,000 feet per minute web travel. As a typical example, using characters of ordinary typewriter size, it is possible to print in the order of 300,000 characters per second, using a web speed in the order of 2,000 feet per minute and producing characters of "pica" size in lines of up to 22 inches length with a maximum of about 132 characters per line.

It is clear from the foregoing that a device constructed according to the invention has the capability of producing characters at an extremely high rate, comparable to the output of an electronic data processing machine. For example, the character generation rate previously mentioned is capable of handling the output of a computer through a buffer interface arranged to control directly the various deflection electrodes in the arrays of the system. The computer output can also be magnetically or otherwise recorded, and used to drive the input of the system.

The invention is not limited to printing or creating of patterns. Controlled placement of liquid drops on a receiving surface is useful also in operations such as etching, coating, particularly over selected areas of the receiving surface, and optical recording or plotting, as well as in processing or fabrication of multiconstituent products.

It is also possible to produce variable three-dimensional displays, using a plurality of arrays, in-line or staggered, and using control over the individual drops to locate them in a pattern, then irradiating the drops at a predetermined time, as by high-speed flashes of light which are timed with reference to some beginning of drop generation. The control over drop generation enables the resulting three-dimensional display to be changed in shape or size within limits of the system.

DESCRIPTION OF THE PREFERRED EMBODIMENTS

Figure 1:
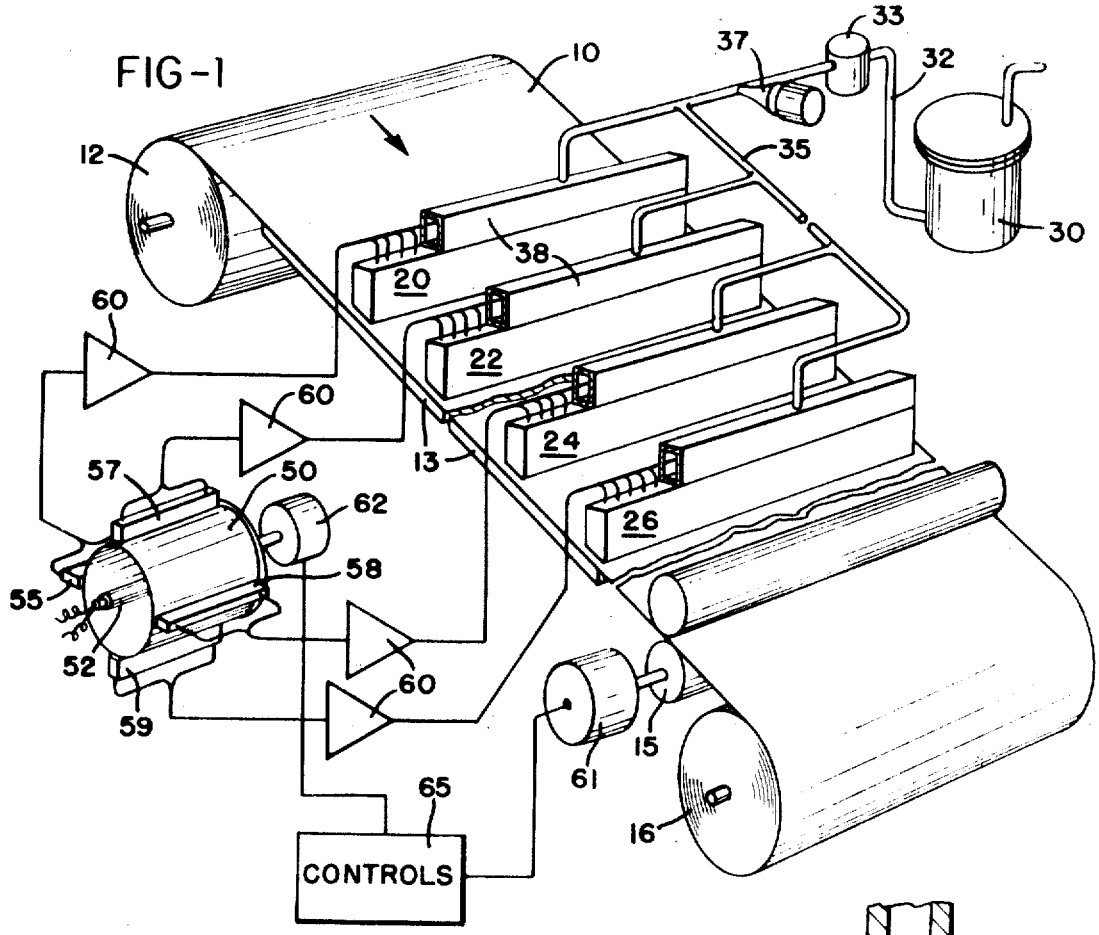
FIG. 1 is a schematic representation of a printing system embodying the present invention, wherein the several drop generating arrays are driven through suitable amplifiers from an electrooptical scanning device on which a master of the image or pattern to be reproduced is scanned, and in which the image or pattern is reproduced repeatedly on a traveling web of paper.

Referring to the drawings, and particularly to FIGS. 1–4, which illustrate one preferred embodiment of the invention, for purposes of explanation the receiving element onto which the pattern or image is to be created, for example repetitively as in a printed operation, is shown as a web of paper 10 from a supply roll 12 passing over supporting structure such as a table 13, past pinch roll 15, and onto a takeup roll 16. Over the table 13 there are a plurality of *longitudinally spaced and laterally extending* arrays of fluid drop sources or projectors, each of which includes a plurality of orifices through which the liquid is expelled in a stream which is broken into individual drops. For purposes of explanation the first *or rearward* array 20 is shown as uppermost and the web 10 passes first beneath this array, then *longitudinally forward* [next] to an array 22 of identical structure, and thence past additional arrays 24 and 26. The web and table are shown broken between the arrays 22 and 24, signifying that the number of arrays is variable, depending upon the desired result.

The liquid substance to be placed precisely on the web 10 is supplied from a reservoir or tank 30 through an output conduit 32 and through a filter 33 to a manifold arrangement 35 which, as shown, apportions and supplies each of the arrays with the liquid under pressure. A vibrator device, such as a supersonic vibrator, is indicated schematically at 37 and is attached to the liquid supply piping in order to impose a high frequency vibration on the entire liquid supply system.

The liquid from the supply piping is directed to a cross manifold in each of the arrays, for example to the manifold 38 of the array 20, and these manifolds in turn have a large number of small orifices 40 (FIG. 3) from which a fine liquid stream is expelled. As a result of the high frequency vibration, the stream rapidly breaks into individual drops which are accordingly spaced. In a typical embodiment the orifices 40 are each of a size in the order of 1.5 mils, and the resultant drops are of a size in the order of 3 mils diameter. Drops of this size typically produce circular printed dots having a diameter of about 5 mils.

The drops are projected in the form of a jet or stream toward the moving web 10. For essentially full coverage of a longitudinal strip of 5 mil width, consecutive droplets from the strip generating orifice should be deposited with a center-to-center dot spacing of about 3.5 mils or less. Since the time between consecutive drops is equal to the reciprocal of the stimulation frequency, the foregoing requirement may be converted into a design specification for the drop stimulator. The equation is $$f=\frac{V_w}{d}$$

where $V_w$ is the velocity of the moving web, d is the desired center-to-center dot spacing, and f is the required stimulation frequency. Assuming a web velocity of about 400 inches per second, the above stated conditions result in a required stimulation frequency of about 120 kHz.

Figure 2:
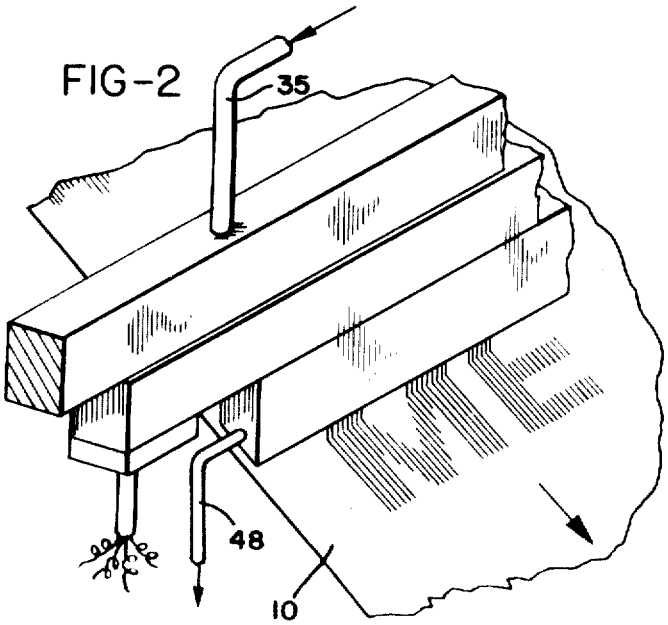
FIG. 2 is a diagrammatic illustration of the manner in which portions of several characters are simultaneously created through control of the drop generating equipment of a single array.

In a system of this type in order to cover an 8-inch wide image area on the web, 1,600 orifices are required spaced on centers 5 mils apart. The physical demands of this system are such that the orifices cannot readily be arranged in a continuous row *laterally* [transversely] of the sheet, hence in order to accommodate the necessary spacing between orifices into their physical size and the size of the related control equipment, the orifices are instead spaced apart a substantially greater distance in each array, and these orifices preferably are evenly spaced, and the arrangement is the same in each array, with the individual arrays being *laterally* offset such that the orifices "track" over separate bands or strips along the sheet and fill with respect to each other in such a manner that if all of the orifices are continuously operating and all drops are permited to strike the surface of the web, the *image area of the* web will be fully covered *by an interlaced series of laterally adjacent and longitudinally extending drop deposit patterns* [across the 8-inch image web]. The arrangement is illustrated in FIG. 2, which shows the beginning of the creation of the letters M and E, with certain of the streams of drops from selected orifices depositing on the web as it moves beneath the first array 20.

In order to control the deposition or nondeposition of the drops each drop which it is desired not to deposit is electrostatically charged by controlling a potential applied to the charge ring 42 spaced in the control structure immediately below the orifice 40. Downstream of the charging electrode is a set of deflecting electrodes 44 which provides a continuous deflecting field operating to deflect charged drops from the stream into a catcher unit 45 which includes a blade 46 projecting outward adjacent, but not intercepting the stream path of the uncharged, and hence not deflected, drops. The drops that are deflected into the catcher accumulate and are recirculated to the reservoir through a return line 48, a segment of which is shown in FIG. 2.

The charge applying electrode 42 thus functions as a means for selectively charging drops which are not to be deposited on the web, and together with the deflecting electrodes 44 and the catcher 45, these parts function as a means for moving from the drop stream those drops which are not to deposit on the web or other receiving element. The system is thus binary, in that absence of a charge results in a drop passing directly to and depositing on the web, whereas presence of a charge results in deflection instead of deposition.

Figure 3:
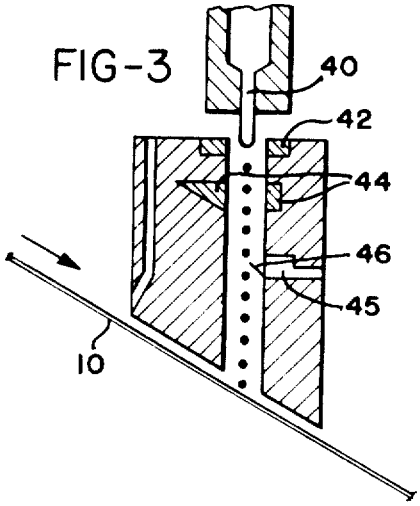
FIG. 3 is an enlarged diagram showing the orifice and deflection equipment incorporated within a single drop generating and controlling unit.

As shown in FIG. 3, it is preferred that the web and the stream of drops intersect at an angle. This angle is so selected that the velocity component parallel to the direction of web travel at the point of impact of the drops approximately equals the velocity of the moving web 10. It has been found that this arrangement results in minimum deformation of the drop as it deposits on the web, and hence results in a dot which is essentially circular in shape on the web.

Figure 4:
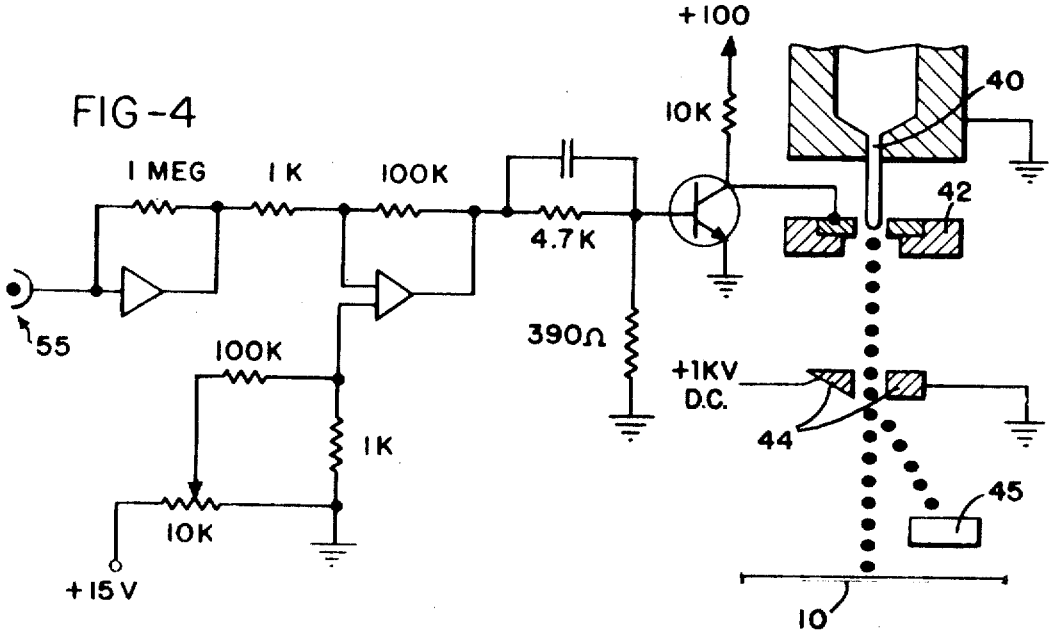
FIG. 4 is a schematic electrical diagram illustrating the manner in which a single drop generating and controlling device functions.

Referring back to FIG. 1, one form of input for the system, in which a pattern or image can be reproduced over and over on the web, is in the form of an optical image storage, such as a photograph or like print, or a photographic film on which the nonimage areas are transparent and the image areas are opaque. This film is mounted on a drum 50 which is transparent, and inside the drum is a suitable lamp 52, whereby light passing through the nonimage areas of the film is arranged to actuate a reading means in the form of a bank of photosensors 55, corresponding in number and in spacing to the orifices 40 in the first array 20. Preferably a plurality of optical fibers (not shown) are arranged across the drum 50 in spaced positions corresponding to the arrangement of the orifices in a corresponding array, and the fibers conduct light to corresponding ones of the photosensors. Light actuating these photosensors is thus translated into electrical signals which are suitably amplified through the amplifier circuits 60, details of which are shown in FIG. 4, and the amplifier outputs in turn are applied to the individual charging rings 42 for each of the control units corresponding to each of the orifices in the array. Therefore, actuation of a particular photosensor will result in applying a charge to its control ring 42, thereby deflecting that drop into the catcher system and preventing deposition of that drop on the web 10.

There are a number of banks of photosensors, indicated by the reference numbers 57, 58 and 59, corresponding in number to the arrays 20 . . . 26, and the spacing of the photosensor banks around the drum 50 corresponding to the spacing of the arrays along the path of the moving web 10. To coordinate the reading means with the printing or depositing function, the drive motor 61 for the drive drum 15 and the drive motor 62 for the record drum 50 are actuated and carefully controlled through control circuits 65 which maintain these drives in synchronism, or alternately drive drum 15 and record drum 50 may be driven by a common shaft.

It is also possible to utilize the capability of the above-described system as a high speed printer for data processing machines. The printer may be controlled from a memory, such as magnetic tape storage or core memory, or in some instances the printer may be driven directly from the output of the computer through buffer units which act to relate the computer output signals to the necessary signals for operating this form of printer.

As an example, assuming as previously mentioned, a web speed of 2,000 feet per minute or 400 inches per second, and assuming that dots may be generated with 1.5 mil orifices which are in the order of 5 mils diameter on the web, it is possible to generate standard typewriter size characters of approximately 80 mils width and 100 mils height, using 16 jets for each character, in other words requiring 16 orifices and their accompanying controls.

Assuming the need for a printer corresponding to presently available high-speed mechanical printers, a capacity of 132 columns, equal to a line of 132 character capacity, can be generated by using signals from the input to identify the character to appear in each column. A standard typewriter font has available 88 different characters, (these can be identified using a seven-bit code) and with a standard line spacing producing lines six to the inch, at the web speed specified approximately 417 microseconds are available from the start of one line to the start of the next line. In this time the printer must have the capability of buffering in and being prepared to generate up to 132 possible characters. Assuming that the seven-bit code is employed for character identification, the requirements are to accept and process in the order of 1,000 bits of information in about 410 microseconds. This is within the present capability of known switching and buffering devices.

Figure 5:
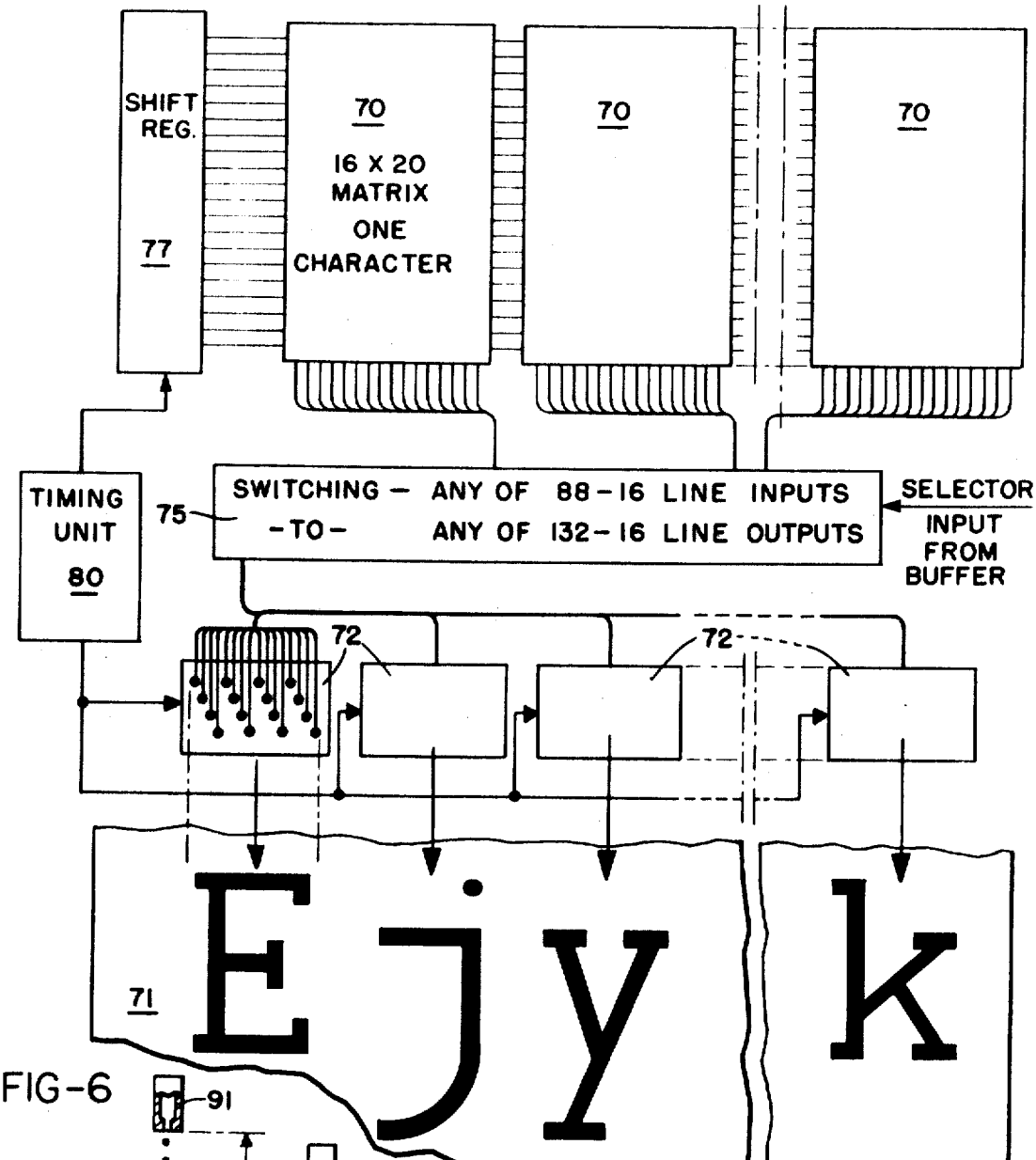
FIG. 5 illustrates a typical printout unit using the principles of the invention.

As seen in FIG. 5, the 88 characters can be produced by 88 diode matrices such as diode matrices shown diagrammatically at 70, each having 20 horizontal rows and 16 vertical subcolumns. Corresponding to the 132 character columns are 132 printing heads 72, each of which may be connected by switching unit 75 to any matrix 70. Each printing head 72 contains 16 orifices corresponding to the 16 vertical subcolumns in that matrix to which the printing head may be connected.

All matrices 70 are simultaneously scanned in timed, vertically progressive steps. For each step every matrix 70 dumps 16 binary bits into switching unit 75. As a result thereof, each orifice control ring 42 is actuated by 20 sequential binary signals corresponding to the coded information in one vertical subcolumn of that matrix 70 to which the parent printing head 72 may be connected. This in turn produces simultaneous, vertically progressive printing of up to 132 characters. At the end of the 20-step sequence, switching unit 75 connects each printing head 72 to the matrix 70 which is programmed for that character which is next scheduled for printing by the subject printing head.

The above-described vertical matrix scan is produced by a 20-stage shift register 77 which in turn is actuated by timing unit 80. Timing unit 80 is also connected to each of the printing heads 72 and serves as a constant frequency control for drop stimulation in all of the orifices. In this manner there is achieved a one-for-one correspondence between generated drops and drop switching signals. For this example the required stimulation frequency is about 120 kHz. and the resulting printing rate, assuming a character in every column is 316,800 characters per second.

Because of previously discussed packaging considerations, it is difficult, if not impractical, to build printing heads 72 in single-array configurations of 16 orifices each. Again, in accordance with the practice of this invention the orifices are staggered in a plurality of arrays as shown in FIG. 5. As shown in the FIG., however, the center-to-center orifice spacing is about 20 mils. In practice, if even this spacing is difficult to achieve, a convenient working model may utilize heads with 16 orifices staggered one behind the other in arrays of one orifice each. As an alternative it is feasible to use an arrangement as shown in FIG. 1. Such an arrangment would employ 16 arrays with 132 orifices per array. The arrays would be electrically connected such that at any given time corresponding orifices in the 16 arrays would all be connected to the same matrix 70. Thus the 16 corresponding orifices would be the equivalent of one printing head 72 as illustrated in FIG. 5.

In order to accommodate the above described physical separation of the orifices it is necessary to make a corresponding adjustment in the orifice switching controls. Referring to FIG. 1, it may be observed that a laterally transverse line on web 10 will pass first under orifice array 20 and thence under each of the other arrays; the transit time from array to array being related to the speed of the web and to the longitudinal separation of the arrays. Therefore, it becomes apparent that if compensation is made for the above transit time, then the orifice arrangement comprising a plurality of *latterally* staggered and longitudinally displaced arrays can be treated as functionally equivalent to a single array with all orifices combined side-by-side in extremely close proximity.

Figure 6:
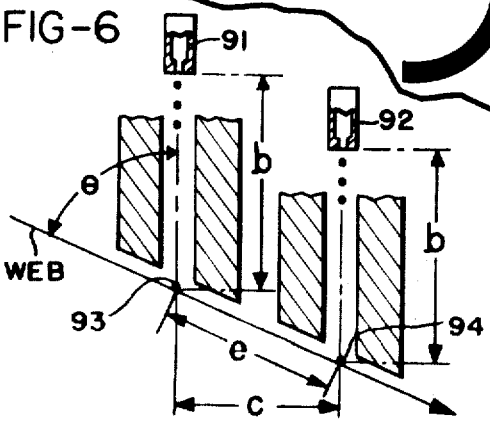
FIG. 6 is a diagram illustrating the related deposit of drops from successive arrays.

FIG. 6 illustrates the geometry of this situation. The Figure shows two orifices 91 and 92 which are representative of members of *laterally* staggered arrays; that is, the orifices are mutually offset in a direction normal to the plane of FIG. 6. It may be observed that a drop leaving orifice 91 simultaneously with a similar drop from orifice 92 will travel for a distance b and strike web 10 at a distance *e* [d] behind the latter drop. In order to place two drops such as drops 93 and 94 precisely side-by-side on web 10, drop 94 must have a delayed release time. That is, the control electronics for the orifices in the front array must operate in a time domain which lags that of the rear array by a time T where:

$$\left[T=\frac{d}{V_w} \text{ or } T=\frac{c}{V_w}\cos\theta\right]$$

$$T=\frac{e}{V_w} \text{ or } T=\frac{c}{V_w}\cos\theta$$

where c is the array spacing distance and $\theta$ is the web intercept angle as illustrated.

Thus, by building an appropriate time delay into the control electronics for the forword array, the two arrays may be programmed and switched as though they were combined into a single array with a double number of orifices. Obviously this concept can be extended to any number of arrays. For a typical web printer as shown in FIG. 1 there may be employed as many as 20 such arrays. This would permit each array to have an orifice-to-orifice spacing of about 0.1 inch and result in *longitudinally extending* drop deposit patterns *which are laterally spaced* [staggered] at 5 mil intervals across the printing area.

It should be appreciated that the required control delays for a plurality of *longitudinally spaced and laterally* staggered arrays may be obtained in many ways. In this regard, storage and retrieval from a shift register is the equivalent of staggered optical sensors modeled after the jet orifices and scanning a control or master image.

It should be appreciated, furthermore, that precise drop deposition requires phase control of the stimulation at every orifice. In practice this may be difficult to achieve. However, for many applications it is adequate merely to provide master timing control for all charge rings 42. Then as long as all orifices are stimulated at the same frequency, each switching charge will catch the desired number of consecutive drops. Since the separation moments for corresponding drops from the various orifices will be randomly distributed throughout one stimulation cycle, the impact points for these drops will be randomly scattered along longitudinal lines of length $$\frac{V_w}{f}.$$

Thus open loop stimulation produces a slight degradation in system resolution.

Figure 7:
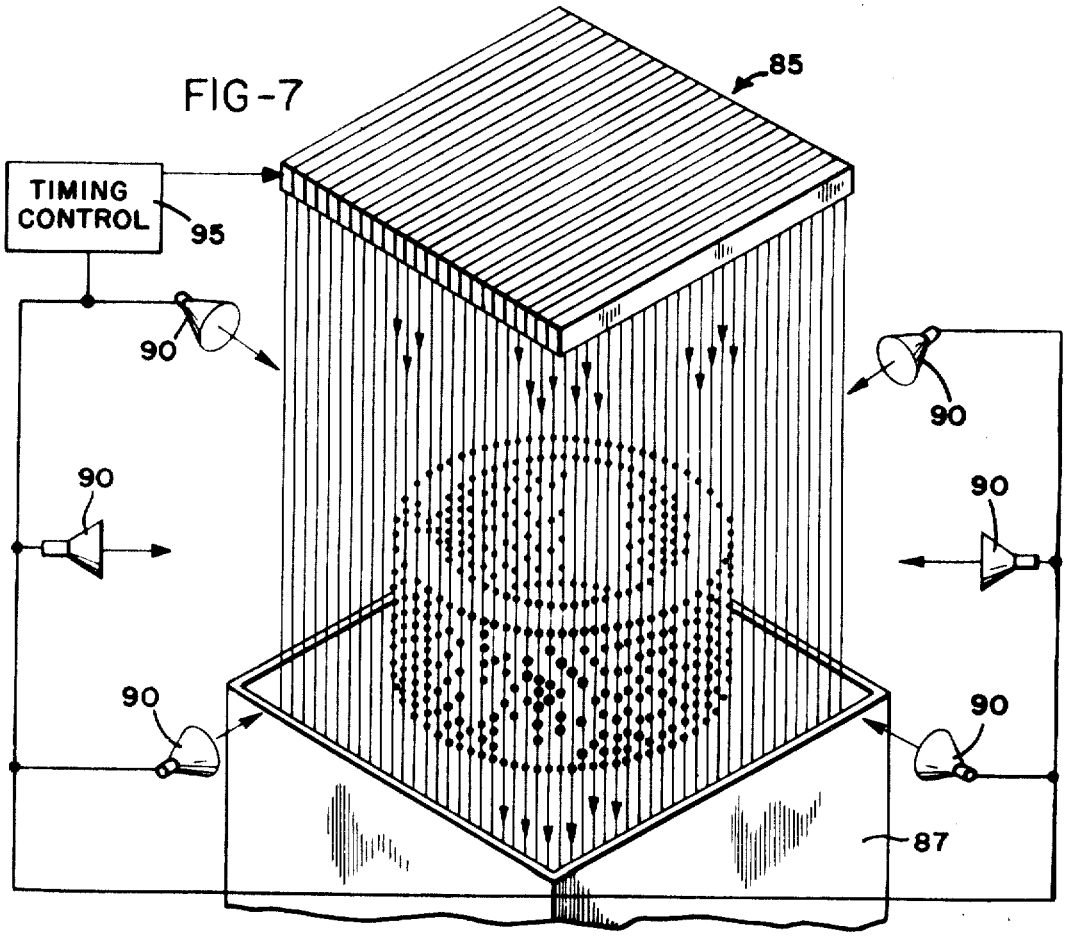
FIG. 7 shows a variable three-dimensional display system.

Referring to FIG. 7 which shows schematically an arrangement for producing variable three-dimensional displays, at the top of the FIG. there are a plurality of closely arranged arrays, indicated by the general reference numeral 85. It will be understood that each array consists of a large number of individual drop generating units (such as shown in FIG. 4, for example). These arrays are closely stacked and regularly spaced, such that drops from each generating unit will fall along a predetermined path precisely spaced with respect to each other, as indicated by the vertical lines in FIG. 7. Since the individual drop generating units can be controlled to project drops at a regular and high frequency, if cross currents of air or the like are eliminated, as by operating in a vacuum or under reduced pressure and controlled conditions, then the drops will project in the same regularly spaced positions toward the catching basin 87 shown at the bottom of FIG. 7. If a single drop generating unit is switched to the "on" condition, and continues to generate drops at regularly spaced intervals, for a predetermined time, these drops will proceed in a trainlike manner toward the lower catch basin 87.

At any given time, these drops will be located in space with respect to their point of origin in the drop generating unit and with respect to each other. It is possible therefore to time the switching of the individual unit such that the drops will be in the form of a patterned line or sequence proceeding vertically downward from the origin at the drop generating unit. Multiplying this arrangement many times, it is thus possible to have a plurality of such vertical drop patterns all precisely related to each other, since the generating unit can be excited at the same high frequency. Therefore, if such an arrangement be produced under controlled light conditions, for example, it is possible to irradiate the drops at a predetermined time, for example by using high-speed flashes of light, to make a three-dimensional pattern visible to an observer.

For example, the plurality of arrays shown in FIG. 7 is surrounded by the number of high-speed flash lamp units 90. These can be of conventional design, sometimes referred to as stroboscopic flash lamps, and preferably are arranged to fire simultaneously, thereby projecting light from a number of different directions toward the falling drops from the arrays. The speed of the light flash is in the order of a microsecond, thus it is possible to "stop" the flight of the drops insofar as the observer is concerned. A suitable timing control, shown schematically at 95, programs the unit such that initiation of a plurality of drop patterns from the various drop generating units starts a time sequence, and when a desired number of drops have fallen in a predetermined pattern, to a predetermined point, the flash lamps are triggered to illuminate the resultant pattern and essentially fix it in space, so far as the observer is concerned, due to persistence of vision. The operation can be repeated at high speeds a number of times.

For example, one can compare the operation to a moving picture display where repetition in the order of 16 frames per second, coupled with the visual persistence of the viewer, produces an image which appears to be either stationary, or to move in a regular manner. By controlling the operation of the individual drop generating units it is thus possible to produce a three-dimensional display which can be essentially static, and viewed from many different angles, and which can be varied by changing the programming of the drop generating unit. This enables an observer to change the shape of the three-dimensional display as he may desire. Such a device is usable in studying various shapes for purposes of mechanical design, artistic design, in the study of mathematical problems dealing with complex three-dimensional objects, or topographical problems, to name just a few uses.

From the foregoing, it will be apparent that each of the embodiments described includes a plurality of arrays of drop generators, all stimulated from a common vibration source. Each generator has a switching means to permit deflecting of selected individual drops from their normal trajectory, thus providing the capability to generate a pattern by locating the remaining drops in predetermined space-time correlation, under the control of a data matrix which responds to some master intelligence such as a memory and buffer input to the system.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention.

We claim:

[1. The method of creating a pattern on a receiving member such as a sheet or web by selective spatial and positioned control over a large number of small liquid drops, comprising the steps of:

a. generating a plurality of rows of liquid jets all directed along parallel trajectories in space, each row of jets having equally spaced jets and the rows being laterally staggered to produce an interleaved drop deposit pattern across the receiving member with the drop deposits adjoining;

b. moving a drop receiving member past the jets at a constant speed such that successive drops in any jet will deposit on the member in adjoining positions whereby a continued deposit of successive drops will produce an essentially continuous line lengthwise of the receiving member;

c. stimulating each of such jets at a common frequency to cause each jet to break into individual drops, the stimulation frequency $$f=\frac{V_w}{d}$$

where $V_w$ is the velocity of the receiving member and d is the center-to-center spacing of adjoining drop deposits; and d. switching selected ones of said drops from their respective trajectories and removing such drops from the system and thus causing the remaining drops to form a pattern of predetermined configuration.]

[2. The method of claim 1, wherein step (d) includes:

e. scanning a master representation of the pattern to be reproduced;

f. creating digital control signals from the scanning operation; and g. and employing the signals from step (f) to control the switching step (d).]

[3. Apparatus for controlled placement in space and time of repetitiously generated liquid drops comprising:

a plurality of arrays of orifices for generation of a plurality of rows of liquid jets each directed along a specific trajectory related to the other jets;

all of said orifices having the same exit area and parallel nozzle axes;

the orifices in each of said arrays having a common center-to-center spacing and the arrays being laterally staggered for production of interleaved adjoining drop deposit patterns across a receiving member moved successively past said arrays, adjoining drop deposits being spaced by a predetermined center-to-center distance (d);

liquid supply means operative to provide all said orifices with liquid at the same pressure thereby providing drops of uniform size and parallel jet trajectories with drops having a common velocity;

means for producing drop stimulation at a common frequency (f) in all of said jets;

switching means including a charging device for each jet arranged to charge selectively predetermined ones of the drops according to a master intelligence input and deflecting means cooperating with said charging devices to switch drops from their respective trajectories according to the charge status of the individual drops;

means for removing drops of one charge status from the jets;

data transfer means for generation of a data matrix in response to a master intelligence input and connected to produce a visible display of said matrix by control of said switching means; and transport drive means operative to move a receiving member such as a web past said arrays at a constant velocity ($V_w$) matched to the drop stimulation frequency (f) and the drop size such that the frequency is relative to the web velocity and drop deposits according to $$f=\frac{V_w}{d}$$

and the deposit areas of successive drops issuing from the same orifice will adjoin on the receiving member.]

[4. Apparatus according to claim 3, said data transfer means comprising timing means for delaying switching commands to jets in successive arrays by amounts correlated to the longitudinal displacements of the arrays with respect to the path of motion of the receiving member and the velocity of the receiving member.]

[5. Apparatus according to claim 3 and further comprising a plurality of rows of sensors arranged in spaced positions corresponding to the arrangement of said arrays and means for transporting a representation of said master intelligence input past said sensors at a velocity corresponding to the velocity of the receiving member.]

[6. Apparatus as defined in claim 3, comprising:

a plurality of rows of photosensors corresponding in number and arrangement to said jets;

means for transporting a representation of the master intelligence past said banks of photosensors;

means for directing radiant energy to which said photosensors respond against said representation of the master intelligence for modification of the energy before it reaches said photosensors, switching controls responsive to individual ones of said photosensors and connected to corresponding ones of said charging devices; and a drive for said transporting means coordinated to said transport drive means to cause a one-to-one reproduction of elemental areas of said master intelligence on said receiving member.]

[7. Apparatus for the rapid precise placement of small drops of liquid in a pattern of predetermined width on a receiving member continuously moving in a direction lengthwise of the pattern, comprising:

a supply of liquid under pressure;

a plurality of arrays of laterally spaced orifices extending across the pattern width of said receiving member, all of said orifices communicating with said liquid pressure supply to develop a series of liquid jets directed in parallel equidistant paths towards said receiving element and said arrays being staggered to produce an interleaved pattern of adjoining drop deposits;

stimulator means imposing on all the jets continuous vibration at a predetermined frequency to cause each of said liquid jets to break into individual drops identical as to size and velocity and equally spaced from each other;

means moving the receiving member to intersect the drop paths at a constant velocity so related to the stimulation frequency that successive drops from the same orifice will make adjoining drop deposits, whereby each drop remaining in each path is deposited in a predestined and different coordinate position on the receiving member;

charging means for selectively applying a charge to each drop in all of said series as each drop is formed;

means providing a deflection field along and normal to the drop paths between said charging means and said receiving member;

means controlling said charge applying means to cause differential charging on a binary basis of corresponding drops in each of said jets at the same instant;

means for diverting the drops having one charge condition and allowing the drops having the other charge condition to continue along the normal jet path to deposit on the receiving member; and said means controlling said charge applying means including:

a support for a master representation of the pattern, reading means having a plurality of sensors corresponding in number to the number of orifices in said array, said reading means being mounted to scan the entire width of said master, driving means synchronized to said means for moving the receiving member and connected to cause relative scanning movement between said master supporting means and said reading means at a rate correlated with the movement of said receiving member, and individual control connections between each of said sensors and corresponding ones of said charge applying means.]

[8. Apparatus as defined in claim 7, wherein:

the master to be reproduced is an optical representation of the pattern;

said supporting means including a rotatable cylinder;

said reading means including a plurality of optical fibers arranged across said cylinder in spaced positions corresponding to the arrangement of the orifices in said arrays;

said sensors comprising a plurality of photoelectric transducers, each one receiving light from a corresponding one of said optical fibers; and said driving means being connected to rotate said cylinder past the opposite ends of said optical fibers.]

[9. Apparatus for the rapid precise placement of small drops of liquid in a pattern of predetermined width on a receiving member moving in a lengthwise direction, comprising:

at least two arrays extending laterally across the width of said pattern and in predetermined space relation with each other in the longitudinal direction of movement of the receiving member;

a source of liquid under pressure connected to each said array;

a plurality of laterally spaced orifices in each array communicating with said liquid pressure supply to develop a series of laterally spaced liquid jets directed along parallel equally spaced paths toward said receiving member;

said jets being spaced laterally from each other by a distance greater than the minimum spacing desired for adjacent areas on said receiving member;

the locations of the jets from one array being offset laterally from those of another such that drops deposited from different arrays are interleaved with each other to cover side-by-side bands lengthwise of said receiving member;

means for imposing on all the jets continuous stimulation at a predetermined frequency to separate said liquid jets into a plurality of streams of individual drops identical as to size and velocity and spaced apart to form successive drop deposits at the same spacing as the spacing between adjacent bands;

switching means for selectively applying electrostatic charges to selected drops from the jets of both of said arrays;

means for deflecting each charged drop from its jet and allowing the uncharged drops to deposit in predetermined locations on said receiving element; and means for moving a receiving member past the arrays at a constant speed equal to the drop generation frequency times the center-to-center spacing of adjoining drop deposits whereby each drop is destined for a predetermined coordinate location on the receiving member and the action of said switching means determines the form of pattern created by deposited drops on the receiving member.]

*10. The method of creating a predetermined image on a receiving member such as a sheet or web by selective removal control over a large number of small liquid drops comprising the steps of:*

*(a) generating a plurality of longitudinally spaced and laterally extending rows of liquid jets all directed along parallel trajectories in space, each row of jets having equally spaced jets and the rows being laterally staggered to produce interlaced and longitudinally extending drop deposit patterns along the receiving member with the drop deposit patterns laterally adjoining and each pattern corresponding to a longitudinally extending line of image information within said image;*

*(b) moving a drop receiving member longitudinally past the jets at a constant forward speed such that successive drops in any jet will deposit on the member in adjoining positions whereby a continued deposit of successive drops will produce aforesaid drop deposit patterns in essentially continuous lines;*

*(c) stimulating each of such jets at a common frequency to cause each jet to break into individual drops of sufficiently close spacing for production of said continuous lines;*

*(d) creating within each of said drop deposit patterns a series of non printed areas corresponding to non imaged spots in the corresponding line of image information, said non printed areas being created for each drop deposit pattern by timed application of an*

*electrical charging field to the jet associated therewith for charging of drops generated during application of said field, and deflecting and catching the drops so charged; and*

*(e) producing registration of the non printed areas within drop deposit patterns created by jets in different ones of said laterally extending rows by delaying the timing of charging field application to each jet for a period of time equal to the time required for the drop receiving member to travel from the rearmost row of jets to the row in which said jet is located.*

*11. Apparatus for controlled placement in space and time of repetitiously generated liquid drops comprising:*

*a plurality of longitudinally spaced and laterally extending arrays of orifices for generation of a plurality of rows of liquid jets each directed along a specific trajectory related to the other jets;*

*all of said orifices having the same exit area and parallel nozzle axes;*

*the orifices in each of said arrays having a common lateral center-to-center spacing and the arrays being laterally staggered for production of interlaced laterally adjoining drop deposit patterns extending longitudinally along a receiving member moved successively past said arrays, said patterns corresponding to longitudinally extending lines of image information in an image to be recorded;*

*liquid supply means operative to provide all said orifices with liquid at the same pressure thereby providing drops of uniform size and parallel jet trajectories with drops having a common velocity;*

*means for producing drop stimulation at a common frequency in all of said jets;*

*switching means including a charging device for each jet arranged to charge selectively predetermined ones of the drops;*

*deflection field means for deflecting all charged drops from their respective trajectories;*

*means for removing the charged and deflected drops from the jets and thereby producing in each of said drop deposit patterns non printed areas corresponding to non imaged spots in the corresponding line of image information;*

*transport drive means operative to move a receiving member such as a web longitudinally past said arrays at a constant forward velocity, productive of longitudinal adjoinment between deposits of successive drops from any jet; and*

*image control means for controlling production of said non printed areas in said drop deposit patterns; said imaging control means comprising means for generating a series of charging signals for each of said switching means and timing delay means for delaying the charging signals applied to switching means for jets in successively forward arrays by a time $e/V_w$ where e is the web travel distance from row to row and $V_w$ is the web velocity.*

*12. Apparatus for recording a predetermined image by controlled deposition of repetitiously generated liquid drops comprising:*

*a plurality of longitudinally spaced and laterally extending arrays of orifices for generation of a plurality of rows of liquid jets each directed along a specific trajectory related to the other jets;*

*all of said orifices having the same exit area and parallel nozzle axes;*

*the orifices in each of said arrays having a common lateral center-to-center spacing and the arroys being laterally staggered for production of interlaced laterally adjoining and longitudinally extending drop deposit patterns along a receiving member moved successively past said arrays in a longitudinal direction;*

*each of said drop deposit patterns corresponding to a longitudinally extending line of image information within said image;*

*liquid supply means operative to provide all said orifices wiht liquid at the same pressure thereby providing drops of uniform size and parallel jet trajectories with drops having a common velocity;*

*means for producing drop stimulation at a common frequency in all of said jets;*

*switching means including a charging device for each jet arranged to charge selectively predetermined ones of the drops according to a series of charging input signals and deflecting means cooperating with said charging devices to remove charged drops from their respective trajectories to create non printed areas in said drop deposit patterns corresponding to non imaged spots in the associated lines of image information;*

*transport means operative to move said receiving member longitudinally past said arrays from back to front at a constant velocity matched to the drop stimulation frequency and the drop size such that the deposit areas of successive drops issuing from the same orifice are adjoined longitudinally on the receiving member; and*

*data transfer means comprising timing means for delaying switching commands to successively forward arrays by amounts equal to the times required for the receiving member to travel longitudinally forward from array to array.*

References Cited

The following references, cited by the Examiner, are of record in the patented file of this patent or the original patent.

UNITED STATES PATENTS

| | | | |
|---|---|---|---|
| 3,452,360 | 6/1969 | Williamson | 346—140 |
| 2,897,264 | 7/1959 | Deuth | 178—6.6 |
| 2,997,361 | 8/1961 | Christopherson et al. | 346—139 C X |
| 2,556,550 | 6/1951 | Murray | 101—426 |
| 2,573,143 | 10/1951 | Jacob | 178—5.2 |
| 3,298,030 | 1/1967 | Lewis et al. | 346—75 |
| 3,373,437 | 3/1968 | Sweet et al. | 346—75 |
| 3,404,221 | 10/1968 | Loughren | 178—5.2 |
| 3,416,153 | 12/1968 | Hertz et al. | 346—75 |

JOSEPH W. HARTARY, Primary Examiner

U.S. Cl. X.R.

178—66 R